United States Patent
Indurkar

(10) Patent No.: US 11,477,624 B1
(45) Date of Patent: *Oct. 18, 2022

(54) ACTIVATION COMMUNICATION ADDRESSES OF INTERNET OF THINGS DEVICES

(71) Applicant: T-MOBILE INNOVATIONS LLC, Overland Park, KS (US)

(72) Inventor: Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/102,627

(22) Filed: Nov. 24, 2020

Related U.S. Application Data

(63) Continuation of application No. 16/821,950, filed on Mar. 17, 2020, now Pat. No. 10,887,741.

(51) Int. Cl.
*H04M 3/00* (2006.01)
*H04W 4/50* (2018.01)
(Continued)

(52) U.S. Cl.
CPC ............... *H04W 4/50* (2018.02); *H04L 61/50* (2022.05); *H04W 8/183* (2013.01); *H04W 8/205* (2013.01);
(Continued)

(58) Field of Classification Search
CPC ............... H04M 15/72; H04M 15/765; H04M 15/7652; H04M 1/2745; H04M 1/2747;
(Continued)

(56) References Cited

U.S. PATENT DOCUMENTS

| | | |
|---|---|---|
| 6,469,998 B1 | 10/2002 | Burgaleta Salinas et al. |
| 9,451,098 B2 | 9/2016 | Zhu et al. |

(Continued)

FOREIGN PATENT DOCUMENTS

| | | |
|---|---|---|
| DE | 102016201360 A1 | 8/2016 |
| EP | 2448301 A1 | 5/2012 |

(Continued)

OTHER PUBLICATIONS

Foreign Communication From a Related Counterpart Application, International Search Report and Written Opinion dated Sep. 28, 2021, International Application No. PCT/US2021/033922 filed on May 24, 2021.

(Continued)

*Primary Examiner* — Joseph Arevalo

(57) ABSTRACT

A method of provisioning wireless communication service to wireless communication devices. The method comprises allocating telephone numbers to a first plurality of devices, allocating the same telephone numbers to a second plurality of devices, transmitting an eSIM provisioning data bundle in a short message service (SMS) message to the first plurality of devices by a first communication network routing node based on the corresponding one of the plurality of telephone numbers, transmitting an eSIM provisioning data bundle in a SMS message to the second plurality of devices by a second communication network routing node based on the corresponding one of the plurality of telephone numbers, wherein the first communication network routing node routes SMS messages in a first region and the second communication network routine node routes SMS messages in a second region, whereby a single telephone number is leveraged by two different devices located in different regions.

20 Claims, 8 Drawing Sheets

(51) Int. Cl.
| | |
|---|---|
| *H04W 8/20* | (2009.01) |
| *H04W 8/18* | (2009.01) |
| *H04L 61/50* | (2022.01) |
| *H04W 4/14* | (2009.01) |
| *G16Y 10/75* | (2020.01) |
| *H04L 101/65* | (2022.01) |

(52) U.S. Cl.
CPC .......... *G16Y 10/75* (2020.01); *H04L 2101/65* (2022.05); *H04W 4/14* (2013.01)

(58) Field of Classification Search
CPC ...... H04M 1/50; H04M 1/56; H04M 1/72583; H04M 2203/5054; H04M 2215/0168; H04M 2215/62; H04M 2215/7036; H04M 2215/724; H04M 2215/7245; H04M 2250/60; H04M 2250/62; H04M 3/42042; H04M 3/42153; H04M 3/44; H04M 3/56; H04M 3/563; H04W 8/26; H04W 4/06; H04W 4/12; H04W 4/90; H04W 72/04; H04W 72/10; H04W 76/10; H04W 76/36; H04W 76/50; H04W 84/14; H04W 80/10; H04W 88/02; H04W 8/18; H04W 8/183; H04W 8/205; H04W 8/245; H04W 92/18
USPC .... 455/425, 419, 418, 416, 466, 404.1, 566, 455/411, 420, 415, 456.3
See application file for complete search history.

(56) References Cited

U.S. PATENT DOCUMENTS

| | | |
|---|---|---|
| 10,455,536 B1 | 10/2019 | Khawand et al. |
| 10,833,929 B2 | 11/2020 | Watsen et al. |
| 10,880,711 B1 | 12/2020 | Holmes |
| 10,887,741 B1 | 1/2021 | Indurkar |
| 11,102,646 B1 | 8/2021 | Indurkar |
| 11,115,810 B1 | 9/2021 | Indurkar |
| 11,140,543 B1 | 10/2021 | Indurkar |
| 11,190,985 B1 | 11/2021 | Indurkar |
| 11,310,654 B1 | 4/2022 | Indurkar |
| 2005/0175019 A1 | 8/2005 | Kalavade et al. |
| 2005/0192035 A1 | 9/2005 | Jiang |
| 2011/0246374 A1* | 10/2011 | Franz ............... G06Q 20/12 705/77 |
| 2012/0252445 A1 | 10/2012 | Lindholm et al. |
| 2013/0029637 A1 | 1/2013 | Hillier et al. |
| 2015/0303966 A1 | 10/2015 | Lee et al. |
| 2015/0334552 A1 | 11/2015 | Li et al. |
| 2016/0020802 A1 | 1/2016 | Lee et al. |
| 2016/0020803 A1 | 1/2016 | Cha et al. |
| 2016/0021484 A1 | 1/2016 | Park et al. |
| 2016/0092145 A1* | 3/2016 | Manning ............... G06F 3/1238 358/1.14 |
| 2016/0119780 A1 | 4/2016 | Jung et al. |
| 2016/0246611 A1 | 8/2016 | Li et al. |
| 2016/0255567 A1 | 9/2016 | Petersson et al. |
| 2016/0269891 A1 | 9/2016 | Chen et al. |
| 2016/0308768 A1 | 10/2016 | Yoon et al. |
| 2017/0118622 A1 | 4/2017 | Jiang |
| 2017/0289788 A1 | 10/2017 | Lalwaney |
| 2018/0014178 A1 | 1/2018 | Baek et al. |
| 2018/0014184 A1 | 1/2018 | Schell et al. |
| 2018/0376325 A1 | 12/2018 | Xu et al. |
| 2019/0058983 A1 | 2/2019 | Guven et al. |
| 2019/0058989 A1 | 2/2019 | Park et al. |
| 2019/0132204 A1 | 5/2019 | McGrath et al. |
| 2019/0140837 A1 | 5/2019 | Cheng et al. |
| 2019/0208405 A1 | 7/2019 | Park et al. |
| 2020/0120494 A1 | 4/2020 | Fares et al. |
| 2020/0154263 A1 | 5/2020 | Guday et al. |
| 2020/0178070 A1 | 6/2020 | Yang et al. |
| 2020/0221294 A1 | 7/2020 | Kang et al. |
| 2020/0228488 A1* | 7/2020 | Xu ..................... H04W 8/205 |
| 2020/0236529 A1 | 7/2020 | Anslot et al. |
| 2020/0260241 A1 | 8/2020 | Sicard |
| 2020/0322846 A1 | 10/2020 | Hampali et al. |
| 2020/0322884 A1 | 10/2020 | Di Girolamo et al. |
| 2020/0351651 A1 | 11/2020 | Koo et al. |
| 2020/0351761 A1 | 11/2020 | Horna |
| 2020/0389783 A1 | 12/2020 | Kang et al. |
| 2020/0404501 A1 | 12/2020 | Kang et al. |
| 2021/0029761 A1 | 1/2021 | Jung et al. |
| 2021/0076195 A1 | 3/2021 | Chaugule et al. |
| 2021/0112401 A1 | 4/2021 | Chadwick et al. |
| 2021/0112413 A1 | 4/2021 | Pazhyannur |
| 2021/0112423 A1 | 4/2021 | Maheshwari et al. |
| 2021/0120387 A1 | 4/2021 | Roy et al. |
| 2021/0120424 A1 | 4/2021 | Kang et al. |
| 2021/0306830 A1 | 9/2021 | Williams et al. |
| 2021/0377722 A1 | 12/2021 | Fan et al. |
| 2021/0377808 A1 | 12/2021 | Indurkar |
| 2022/0191678 A1 | 6/2022 | Indurkar |

FOREIGN PATENT DOCUMENTS

| | | |
|---|---|---|
| WO | 2018018332 A1 | 10/2018 |
| WO | 20210242697 A1 | 12/2021 |

OTHER PUBLICATIONS

Indurkar, Dhananjay, et al., "Electronic Subscriber Identity Module (eSIM) Profile Delivery and Activation System and Methods" filed Feb. 28, 2022, U.S. Appl. No. 17/683,328.
Notice of Allowance dated Aug. 10, 2021, U.S. Appl. No. 16/886,521, filed May 28, 2020.
Indurkar, Dhananjay, "Embedded Subscriber Identity Module (eSIM) Profile Adaptation Based on Context," filed Aug. 27, 2021, U.S. Appl. No. 17/459,763.
Indurkar, Dhananjay, "Bootstrap Electronic Subscriber Identity Module Configuration," filed Aug. 20, 2021, U.S. Appl. No. 17/408,366.
Notice of Allowance dated Jun. 14, 2021, U.S. Appl. No. 16/880,723, filed May 21, 2020.
Notice of Allowace dated May 19, 2021, U.S. Appl. No. 16/821,937, filed Mar. 17, 2020.
Indurkar, Dhananjay, et al., "Electronic Subscriber Identity Module (eSIM) Profile Delivery and Activation System and Methods" filed Sep. 16, 2020, U.S. Appl. No. 17/023,347.
Indurkar, Dhananjay, et al., "Electronic Subscriber Identity Module (eSIM) Profile Provisioning" filed Sep. 16, 2020, U.S. Appl. No. 17/023,352.
Indurkar, Dhananjay, et al., "Embedded Subscriber Identity Module (eSIM) Profile Adaptation Based on Context," filed May 18, 2021, International Application No. PCT/US21/33041.
Indurkar, Dhananjay, et al., "Internet of Things (IoT) Devices Wireless Communication Service Management Platform" filed May 24, 2021, International Application No. PCT/US21/33922.
Notice of Allowance dated Dec. 30, 2021, U.S. Appl. No. 17/023,347, filed Sep. 16, 2020.
Foreign Communication From a Related Counterpart Application, International Search Report and Written Opinion dated Sep. 28, 2021, International Application No. PCT/US2021/033041 filed on May 18, 2021.
Indurkar, Dhananjay, "Embedded Subscriber Identity Module (eSIM) Profile Adaptation Based on Context," filed May 21, 2020, U.S. Appl. No. 16/880,723.
Indurkar, Dhananjay, "Bootstrap Electronic Subscriber Identity Module Configuration," filed Mar. 17, 2020, U.S. Appl. No. 16/821,937.
Indurkar, Dhananjay, "Triggering Electronic Subscriber Identity Module Activation", filed Mar. 17, 2020, U.S. Appl. No. 16/821,943.
Indurkar, Dhananjay, "Internet of Things (IoT) Devices Wireless Communication Service Management Platform" filed May 28, 2020, U.S. Appl. No. 16/886,521.
Notice of Allowance dated Sep. 4, 2020, U.S. Appl. No. 16/821,950, filed Feb. 17, 2020.
First Action Interview Pilot Program Pre-Interview Communication dated Jan. 29, 2021, U.S. Appl. No. 16/821,943, filed Feb. 19, 2021.

(56) References Cited

OTHER PUBLICATIONS

FAIPP Pre-Interview Communication dated Apr. 15, 2021, U.S. Appl. No. 16/880,723, filed May 21, 2020.
FAIPP Pre-Interview Communication dated Mar. 26, 2021, U.S. Appl. No. 16/821,937, filed Mar. 17, 2020.
Notice of Allowance dated Apr. 29, 2021, U.S. Appl. No. 16/821,943, filed Feb. 19, 2021.
FAIPP Pre-Interview Communication dated Apr. 5, 2021, U.S. Appl. No. 16/886,521, filed May 28, 2020.
FAIPP Pre-Interview Communication dated Apr. 22, 2022, filed Sep. 16, 2020, U.S. Appl. No. 17/023,352.
Notice of Allowance dated Jun. 7, 2022, filed Sep. 16, 2020, U.S. Appl. No. 17/023,352.

* cited by examiner

ACTIVATION COMMUNICATION ADDRESSES OF INTERNET OF THINGS DEVICES

CROSS-REFERENCE TO RELATED APPLICATIONS

This application is a continuation of and claims priority under 35 U.S.C. § 120 to U.S. patent application Ser. No. 16/821,950 filed on Mar. 17, 2020, entitled "Activation Communication Addresses of Internet of Things Devices" by Dhananjay Indurkar, which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may authenticate into a radio access network (RAN) operated by a cellular communication service provider by presenting confidential authentication credentials to a cell site, for example to a cell tower. In an initial state, a wireless device may not yet be provisioned with authentication credentials. In this case, the wireless device may be granted provisional access to the RAN subject to the constraint that it may only perform activation activities such as messaging with a provisioning system to obtain conventional authentication credentials. The authentication credentials may be stored in an electronic subscriber identity module (eSIM) chip that is integrated into the mobile communication device, for example electrically connected to the communication bus of the wireless communication device circuit card. This eSIM may be said to be non-removable, in the sense that a non-technical lay person could not ordinarily remove the eSIM without damaging the wireless communication device.

SUMMARY

In an embodiment, a method of provisioning wireless communication service to wireless communication devices is disclosed. The method comprises allocating a plurality of telephone numbers to a first plurality of wireless communication devices by an activation management application executing on a computer system, allocating the plurality of telephone numbers to a second plurality of wireless communication devices by the activation management application, and receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers. The method further comprises transmitting an eSIM provisioning data bundle in a short message service (SMS) message to each of the first plurality of wireless communication devices by a first communication network routing node based on the corresponding one of the plurality of telephone numbers and receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers. The method further comprises transmitting an eSIM provisioning data bundle in a SMS message to each of the second plurality of wireless communication devices by a second communication network routing node based on the corresponding one of the plurality of telephone numbers, wherein the first communication network routing node routes SMS messages in a first region and the second communication network routine node routes SMS messages in a second region, whereby a single telephone number is leveraged by two different wireless communication devices located in different regions.

In another embodiment, another method of provisioning wireless communication service to wireless communication devices is disclosed. The method comprises allocating a plurality of telephone numbers to a first plurality of wireless communication devices by an activation management application executing on a computer system, receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers, and transmitting an eSIM provisioning data bundle in a short message service (SMS) message to each of the first plurality of wireless communication devices based on the corresponding one of the plurality of telephone numbers. The method further comprises deallocating the plurality of telephone numbers from the first plurality of wireless communication devices by the activation management application based on the transmitting of eSIM provisioning data bundles to the first plurality of wireless communication devices and allocating the plurality of telephone numbers to a second plurality of wireless communication devices by the activation management application. The method further comprises receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers and transmitting an eSIM provisioning data bundle in a SMS message to each of the second plurality of wireless communication devices based on the corresponding one of the plurality of telephone numbers, whereby a single telephone number is leveraged by two different wireless communication devices at two different times.

In yet another embodiment, a method of provisioning wireless communication service to wireless communication devices is disclosed. The method comprises allocating a plurality of telephone numbers to a first plurality of wireless communication devices by an activation management application executing on a computer system, where the first plurality of wireless communication devices are a first type of device and allocating the plurality of telephone numbers to a second plurality of wireless communication devices by the activation management application, wherein the second plurality of wireless communication devices are a second type of device. The method further comprises receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers and transmitting an eSIM provisioning data bundle in a short message service (SMS) message to each of the first plurality of wireless communication devices by a first communication network routing node based on the corresponding one of the plurality of telephone numbers. The method further comprises receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers and transmitting an eSIM provisioning data bundle in a SMS message to each of the second plurality of wireless communication devices by a second communication network routing node based on the corresponding one of the plurality of telephone numbers, wherein the first communication network routing node routes SMS messages to wireless communication devices of the first type of device and the second communication network routine node routes SMS messages to wireless communication devices of the second type of device, whereby a single telephone number is leveraged by two different wireless communication devices that are of two different device types.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
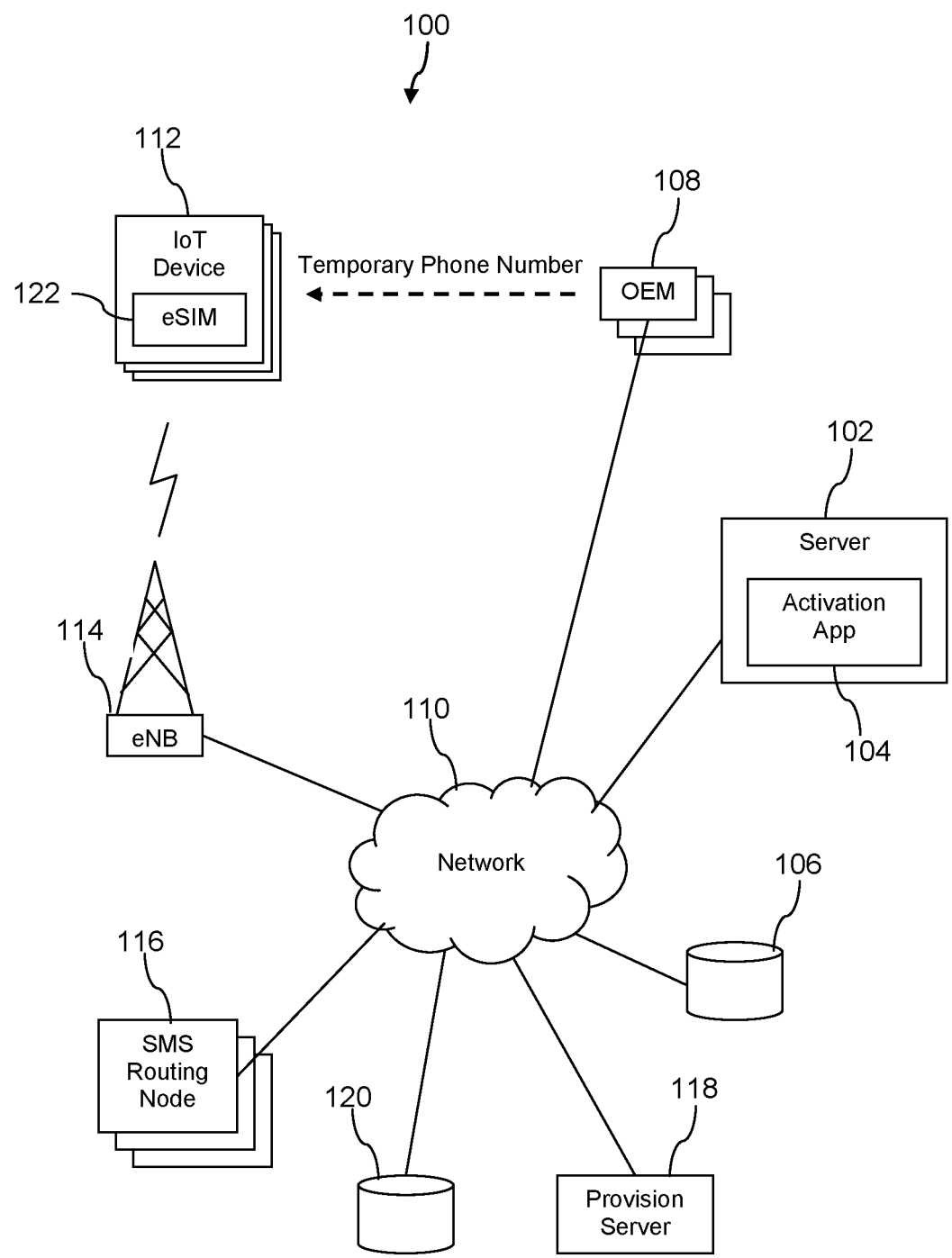
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It is contemplated that a wireless communication service provider may provide communication services to as many as 25 billion Internet-of-things (loT) devices in the future. An approach for provisioning these devices for communication service is to have an IoT device that has been configured with a bootstrap electronic subscriber identity module (eSIM) data package wirelessly send a brief message (e.g., an SMS message, an MMS message, an IP notification message, or other short form message) to a server to request to be provisioned with one or more conventional eSIM provisioning data bundles. The request comprises a telephone number defined in the bootstrap eSIM data package of the IoT device. The server sends one or more SMS messages or MMS messages addressed to the telephone number provided in the brief message sent by the IoT device. In an embodiment, the server sends a SMS message or MMS message to the IoT device providing an address of a provisioning server. The IoT device then establishes a communication session using hypertext markup language transport protocol (HTTP), bearer independent protocol (BIP), or another data communication protocol with the provisioning server and downloads one or more conventional eSIM data packages. Alternatively, in another embodiment, the provisioning server downloads one or more conventional eSIM data packages to the IoT device via one or more SMS messages or MMS messages addressed to the telephone number associated with the IoT device.

In some contexts the eSIM provisioning data bundle may be referred to as an eSIM profile. The eSIM profile comprises wireless communication service provider data and wireless communication service subscriber data. The eSIM profile may comprise an Internet address, a preferred roaming list (PRL), authentication keys, spectrum bands that the IoT device is authorized to use, and other communication provisioning data. In at least some embodiments, the conventional eSIM profiles provisioned to the IoT devices by the process summarized above do not comprise telephone numbers, because once configured with a conventional eSIM profile, the IoT device will not communicate via voice communication channels but instead will communication by data communication channels and may instead be addressed, for example, by an IP address or other data communication address (e.g., not addressed based on a telephone number). For more details about bootstrapping IoT devices to obtain eSIM profiles and managing the eSIM profiles installed in IoT devices see U.S. patent application Ser. No. 16/821,937, filed Mar. 17, 2020 and entitled "Bootstrap Electronic Subscriber Identity Module Configuration," by Dhananjay Indurkar and U.S. patent application Ser. No. 16/821,943, filed Mar. 17, 2020 and entitled "Triggering Electronic Subscriber Identity Module Activation," by Dhananjay Indurkar, both of which are hereby incorporated by reference herein, each in its entirety.

A problem arises, however, in providing each of 25 billion IoT devices with telephone numbers. It may be impracticable for a wireless communication service provider to allocate 25 billion telephone numbers to IoT devices. The present disclosure teaches a system and methods for associating a limited set of telephone numbers to a large number of IoT devices. These different methods are described, at least in part, separately below, but it is understood that at least some of the methods may be combined with each other.

In an embodiment, a conventional ten-digit telephone number is padded or extended with extra digits to multiply the number of unique telephone numbers supported by a limited set of ten-digit telephone numbers. For example, a limited set of phone numbers in the range XXX-YY0-0000 to XXX-YY9-9999 constitutes 100,000 unique telephone numbers. By extending each of these ten-digit telephone numbers in the range with four additional digits, the 100,000 unique telephone numbers can be increased to 1 billion unique telephone numbers. These kind of extended telephone numbers are routable within a home network of a communication subscription account. The associations between the IoT devices and the extended telephone numbers may be provisioned into an SMS routing node in the service provider's network at about the same time these associations are shared with original equipment manufacturers (OEMs) of the IoT devices. The IoT devices may be configured by the OEMs with the extended telephone numbers, and the IoT device informs the server of its extended telephone number when requesting eSIM profile provisioning.

In an embodiment, the server sends a message containing an address of a provisioning server to the IoT device in an SMS message or MMS message addressed to the extended telephone number, and the provisioned SMS routing node accordingly routes the SMS message or MMS message to the IoT device. The IoT device establishes a data communication session with the provisioning server and downloads one or more eSIM profiles. Alternatively, in another embodiment, the provisioning server sends the eSIM profile or profiles to the IoT device in one or more SMS message or MMS message addressed to the extended telephone number, and the provisioned SMS routing node accordingly routes the SMS messages or MMS messages to the IoT device. In an embodiment, the ten-digit telephone numbers may be extended with a unique hardware identifier of the IoT devices.

In an embodiment, a limited range of conventional ten-digit telephone numbers may be overloaded for use by IoT devices located in different communication routing regions. For example, a first 100,000 IoT devices released in a first routing region may be provisioned with telephone numbers XXX-YY0-0000 to XXX-YY9-9999, a second 100,000 IoT devices released in a second routing region may be provisioned with the same telephone numbers XXX-YY0-0000 to XXX-YY9-9999, a third 100,000 IoT devices released in a third routing region may be provisioned with the same telephone numbers XXX-YY0-0000 to XXX-YY9-9999, and a fourth 100,000 IoT devices released in a fourth routing region may be provisioned with the same telephone numbers XXX-YY0-0000 to XXX-YY9-9999. The service provider associated with these 400,000 IoT devices configures a first network routing node (e.g., a home location register (HLR) and/or a visitor location register (VLR)) in the first routing region to route SMS messages or MMS messages addressed to the telephone numbers XXX-YY0-0000 to XXX-YY9-9999 to the first 100,000 IoT devices, configures a second network routing node in the second routing region to route SMS messages addressed to the telephone numbers XXX-YY0-0000 to XXX-YY9-9999 to the second 100,000 IoT devices, configures a third network routing node in the third routing region to route SMS messages or MMS messages addressed to the telephone numbers XXX-YY0-0000 to XXX-YY9-9999 to the third 100,000 IoT devices, and configures a fourth network routing node in the fourth routing region to route SMS messages addressed to the telephone numbers XXX-YY0-0000 to XXX-YY9-9999 to the fourth 100,000 IoT devices. In this way, the 100,000 unique ten-digit telephone numbers are leveraged to address 400,000 different IoT devices.

In an embodiment, ten-digit telephone numbers may be allocated to IoT devices temporarily and recovered after each IoT device bootstraps to a conventional eSIM profile. Ten-digit telephone numbers that have been released by provisioned IoT devices may then be recycled to other IoT devices, for example IoT devices being manufactured by OEMs or IoT devices in the process of being shipped from fulfillment centers. These IoT devices that receive recycled ten-digit telephone numbers, in turn, will release their assigned ten-digit telephone number after they have bootstrapped to a conventional eSIM profile and release again the ten-digit telephone number for yet another recycling allocation. This recycling of telephone numbers may be employed with telephone numbers having more than ten-digits and/or telephone numbers with padding digits. An activation management application executing on a computer in the service provider's network may manage both the allocation and the deallocation of these telephone numbers to avoid losing track of what IoT device is provisioned with what telephone number and also to be able to know what deallocated telephone numbers are available for recycling and/or reallocation. In an embodiment, different routing of telephone numbers may be applied to different models of IoT devices, and this too can be used to increase the number of IoT devices that can be uniquely addressed by a limited set of ten-digit telephone numbers.

Turning now to FIG. 1, a system 100 is described. In an embodiment, the system 100 comprises a computer system 102 that executes an activation management application 104. The activation management application 104 accesses a data store 106 via a network 110 and provides associations of telephone numbers to identities of IoT devices 112 to OEMs 108. The network 110 comprises one or more private networks, one or more public networks, or a combination thereof. The system 100 further comprises a cell site 114, one or more SMS routing nodes 116, a provisioning server 118, and a data store 120 comprising eSIM provision data bundles (e.g., eSIM profiles). Computer systems are described further hereinafter. It is understood that the system 100 may comprise any number of IoT devices 112, any number of OEMs 108, any number of cell sites 114, and any number of SMS routing nodes 116. In an embodiment, the SMS routing nodes may route SMS messages and/or MMS messages to IoT devices 112 based on telephone numbers associated at least temporarily with the IoT devices 112.

Each association comprises one telephone number and the identity of one IoT device 112. The telephone number may be a ten-digit telephone number. The telephone number may be a mobile station international subscriber directory number (MSISDN). The telephone number may be a ten-digit telephone number padded out with additional digits, for example padded out with three digits, four digits, or five digits. The identity of the IoT device 112 may be an international mobile subscriber identity (IMSI), an electronic serial number (ESN), or another unique identity. The activation management application 104 may provide the associations to the OEMs 108 on the event of the OEMs 108 building and/or configuring the IoT devices 112, for example configuring the IoT devices 112 with a bootstrap eSIM profile that comprises the telephone number associated to that specific IoT device 112 by the identity of the IoT device 112.

In an embodiment, the association between the telephone number and the identity of the IoT device 112 is a temporary association that is valid until the IoT device 112 bootstraps and is provisioned by the provisioning server 118 with at least one eSIM provisioning data bundle 122 from the data store 120. The eSIM provisioning data bundle 122 may be referred to as a conventional eSIM profile or an eSIM profile in some contexts and is distinct from a bootstrap eSIM profile. Each OEM 108 may operate its own provisioning server 118 and maintain its own data store 120. Alternatively, a plurality of OEMs 108 may collaborate and share the use of the provisioning server 118 and the data store 120. When the IoT device 112 has been provisioned with at least one eSIM provisioning data bundle 122, the activation management application 104 may break the association of the telephone number and the specific IoT device 112. In an embodiment, the activation management application 104 may delete the association of the telephone number to the identity of the IoT device 112 from a first table in the data store 106 and add the telephone number to an "available telephone numbers" table in the data store 106.

The IoT devices 112 may comprise different kinds of communication devices. Some of the IoT devices 112 may be embedded in different systems, for example in a refrigerator or other consumer appliance, in commercial HVAC equipment installations, in utility meters. Some of the IoT devices 112 may be adhered to items such as shipping containers or truck trailers. The IoT devices 112 have wireless communication capabilities and are able to communicate wirelessly with a cell site 114. In an embodiment, short message service (SMS) messages and/or multimedia message service (MMS) messages addressed to the telephone number associated to the identity of the IoT device 112 may be received by an SMS routing node 116 from the network 110 and routed to the IoT device 112 via the cell site 114 currently providing wireless coverage to the IoT device 112. In an embodiment, the SMS routing node 116 may be a home location register (HLR). In an embodiment, the SMS routing node 116 may be a visiting location register (VLR). While the SMS routing nodes 116 may customarily be abstracted as being located in the network 110, they are represented separate from the network 110 in FIG. 1 to promote discussions of their role in this disclosure.

Different SMS routing nodes 116 may be provisioned to route different SMS messages and/or MMS messages addressed to the same telephone number to different IoT devices 112. For example, a first SMS routing node 116 may be provisioned to route a first SMS message addressed to a first telephone number to a first IoT device 112, while a second SMS routing node 116 may be provisioned to route a second SMS message addressed to the first telephone number to a second IoT device 112. In this example, the two differently provisioned SMS routing nodes 116 may be configured to route SMS messages and/or other communication traffic for different kinds of IoT devices 112. In this way, the single telephone number is associated with a plurality of different IoT devices 112.

The activation management application 104 may provision the SMS routing node 116 with the association of the telephone number to the identity of the IoT device 112 when it provides the same association to the OEM 108. This process of provisioning the SMS routing node 116 is abstractly represented by a dotted arrow line directed from the OEM 108 to the IoT device 112 and suggested by the text "temporary phone number" in FIG. 1. When the IoT device 112 enters coverage of a cell site 114 and provides its unique identity (e.g., its IMSI), the SMS routing node 116 will learn that this IoT device 112 is in coverage of that cell site 114 and maintain an association of that unique identity to that cell site 114. When a SMS message and/or MMS message is transmitted to the SMS routing node 116 that is addressed to the telephone number, the SMS routing node 116 may associate that SMS message and/or MMS message to that cell site 114 and that IoT device 112 based on that learning. The SMS routing node 116 may send the SMS message and/or MMS message to the cell site 114, and the cell site 114 may send the SMS message and/or MMS message to the IoT device 112. When the association of the identity of the IoT device 112 to the telephone number is broken (e.g., after the IoT device 112 has bootstrapped to a conventional eSIM provisioning data bundle), the activation management application 104 may instruct the SMS routing node 116 to delete the association of the telephone number to the identity of the IoT device 112, may delete the association between the telephone number and the identity of the IoT device 112 in the data store 106, and may add the deallocated telephone number to a list or table of free telephone numbers (e.g., available for reallocation).

Figure 2:
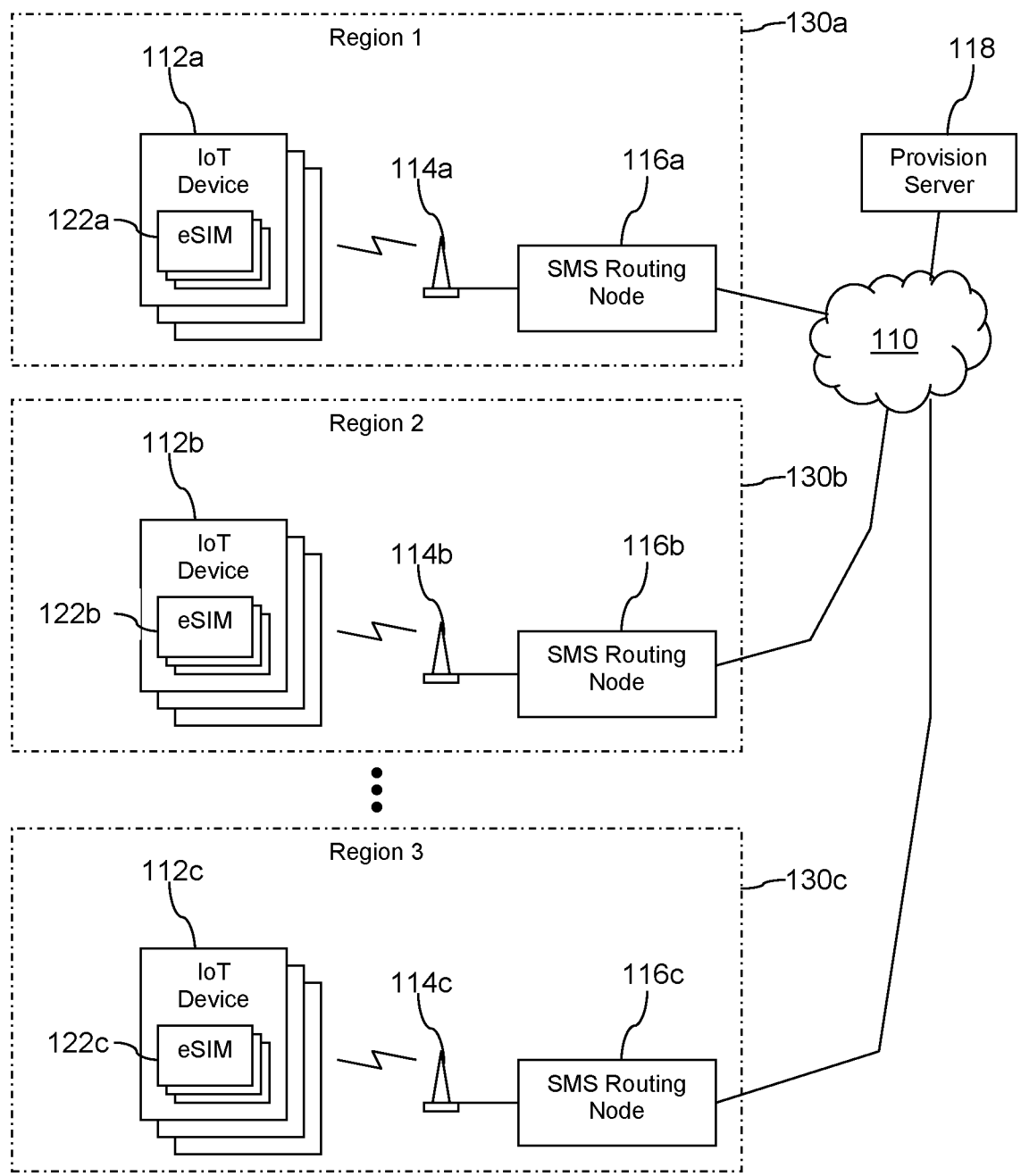
FIG. 2 is a block diagram of a detail of the communication system according to an embodiment of the disclosure.

Turning now to FIG. 2, further details of the system 100 are described. In an embodiment, at least some of the different SMS routing nodes 116 may be located in different regions of the country and be provisioned with regionally distinct routing mappings. Said in other words, SMS routing nodes 116 located in different regions may route SMS messages and/or MMS messages directed to the same telephone numbers differently. As illustrated in FIG. 2, a first region 130a comprises first IoT devices 112a, a first cell site 114a, and a first SMS routing node 116a. A second region 130b comprises second IoT devices 112b, a first cell site 114b, and a second SMS routing node 116b. A third region 130c comprises third IoT devices 112c, a third cell site 114c, and a third SMS routing node 116c. Each of the SMS routing nodes 116a, 116b, and 116c may communicate with the network 110 and with a provisioning server 118 via the network 110.

The activation management application 104 may manage a pool of telephone numbers and overload them by reusing the same phone numbers in different regions to address different IoT devices 112. It is noted that the region 130 need not be defined as a fixed area but may be defined arbitrarily and may be dynamically redefined, for example redefined to achieve an approximate balance of allocations of telephone numbers among the different regions. In an embodiment, the regions 130 may be defined by the demarcations between the purviews of the SMS routing nodes 116. If the purview of the first SMS routing node 116a is expanded, the first region 130a inherently is expanded. If the purview of the first SMS routing node 116a is reduced, the first region 130a inherently is contracted.

As described above, after the IoT device 112 bootstraps and is provisioned by the provisioning server 118 with an eSIM provisioning data bundle 122 (e.g., an eSIM profile) from the data store 120 (e.g., the first IoT device 112a is provisioned with a first eSIM provisioning data bundle 122a, the second IoT device 112b is provisioned with a second eSIM provisioning data bundle 122b, and the third IoT device 112c is provisioned with a third eSIM provisioning data bundle 122c), the associations between the phone numbers and the IoT devices 112 may be broken or destroyed, thereby freeing the phone numbers for reuse by a different IoT device 112. The available phone numbers table in data store 106 may be segregated by regions 130, such that a phone number may be listed as available for use in the first region 130a while the same phone number is not listed as available for use in the second region 130b. Alternatively, the data store 106 may comprise a plurality of available phone number tables, each table associated with one of the regions 130, such that a phone number may be listed as available for use in an available phone numbers table associated with the first region 130a while at the same time the same phone number may be listed as available for use in an available phone numbers table associated with the third region 130c.

Figure 3:
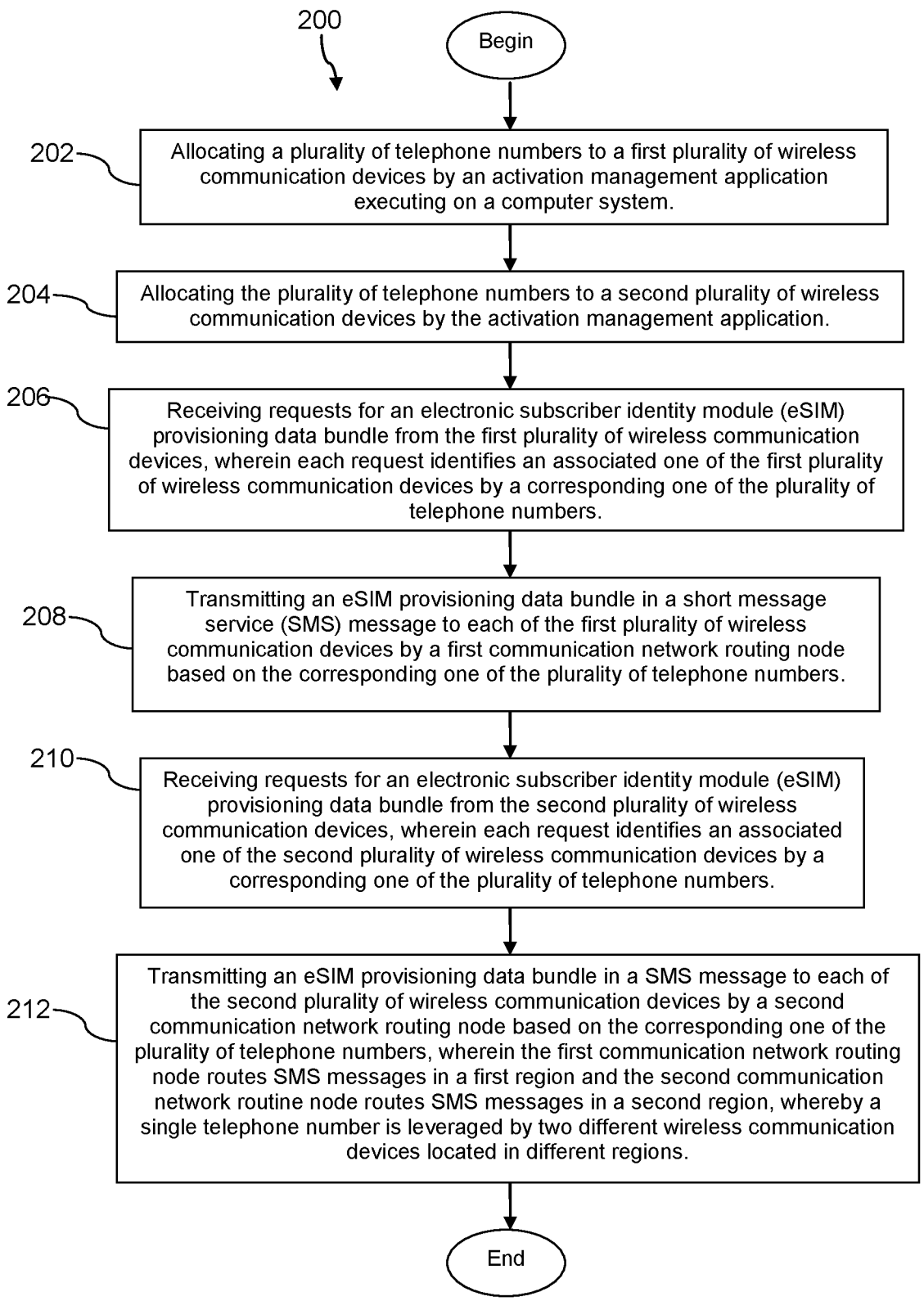
FIG. 3 is a flow chart of a method according to an embodiment of the disclosure.

Turning now to FIG. 3, a method 200 is described. In an embodiment, method 200 is a method of provisioning wireless communication service to wireless communication devices. At block 202, the method 200 comprises allocating a plurality of telephone numbers to a first plurality of wireless communication devices by an activation management application executing on a computer system. In embodiments, the telephone numbers are ten-digit telephone numbers. In embodiments, the telephone numbers comprise a ten-digit telephone number padded with extra digits to extend the range of different values of a pool of ten-digit telephone numbers assigned for use to a wireless communication service provider. The wireless communication devices may be IoT devices. The wireless communication devices may be laptop computers, notebook computers, or tablet computers. The wireless communication devices may be mobile phones, smart phones, personal digital assistants (PDAs), or wearable computers. The wireless communication devices may be any combination of these different kinds of devices.

In an embodiment, the allocation of telephone numbers of block 202 may comprise the activation management application 104 creating associations between each of the telephone numbers and an identity of an associated one of the first plurality of mobile communication devices and storing these associations in the data store 106. The associations of telephone numbers to the first plurality of mobile communication devices may be stored in a first data table or a first list in the data store 106 that is associated with a first routing region.

At block 204, the method 200 comprises allocating the plurality of telephone numbers to a second plurality of wireless communication devices by the activation management application. In an embodiment, the allocation of telephone numbers of block 204 may comprise the activation management application 104 creating associations between each of the telephone numbers and an identity of an associated one of the second plurality of mobile communication devices and storing these associations in the data store 106. The associations of telephone numbers to the second plurality of mobile communication devices may be stored in a second data table or a second list in the data store 106 that is associated with a second routing region. At block 206, the method 200 comprises receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers.

At block 208, the method 200 comprises transmitting an eSIM provisioning data bundle in a short message service (SMS) message or multimedia message service (MMS) message to each of the first plurality of wireless communication devices by a first communication network routing node based on the corresponding one of the plurality of telephone numbers. The eSIM provisioning data bundle may then be used to configure the first plurality of wireless communication devices to receive wireless communication services, for example subscription wireless communication services. A bootstrap eSIM profile of the wireless communication devices may be erased and/or overwritten when the eSIM provisioning bundle is downloaded onto the wireless communication device. In an embodiment, the eSIM provisioning data bundle may be transmitted in a series of SMS messages or a series of MMS messages to each of the first plurality of wireless communication devices (e.g., the eSIM provisioning data bundle may be too large to be transmitted in a single SMS message or a single MMS message). In an embodiment, the method 200 may comprise provisioning the first communication network routing node to route SMS messages and/or MMS messages addressed to the plurality of telephone numbers to the first plurality of wireless communication devices before the processing of block 208.

This provisioning of the first communication network routing node may be completed based on the associations between the telephone numbers and the identities of the first plurality of wireless communication devices stored in the data store 106.

At block 210, the method 200 comprises receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers. At block 212, the method 200 comprises transmitting an eSIM provisioning data bundle in an SMS message or an MMS message to each of the second plurality of wireless communication devices by a second communication network routing node based on the corresponding one of the plurality of telephone numbers, wherein the first communication network routing node routes SMS messages and/or MMS messages in a first region and the second communication network routine node routes SMS messages and/or MMS messages in a second region, whereby a single telephone number is leveraged by two different wireless communication devices located in different regions. The eSIM provisioning data bundle may then be used to configure the second plurality of wireless communication devices to receive wireless communication services, for example subscription wireless communication services. In embodiments, the method 200 may comprise provisioning the second communication network routing node to route SMS messages and/or MMS messages addressed to the plurality of telephone numbers to the second plurality of wireless communication devices before the processing of block 212. This provisioning of the second communication network routing node may be completed based on the associations between the telephone numbers and the identities of the second plurality of wireless communication devices stored in the data store 106.

In embodiments, the method 200 may further comprise allocating some of the plurality of telephone numbers to a third plurality of wireless communication devices by the activation management application, where the some of the plurality of telephone numbers were previously allocated to wireless communication devices among the first plurality of wireless communication devices that have completed bootstrapping and have been provisioned with eSIM provisioning data bundles and provisioning the first communication network routing node to route SMS messages and/or MMS messages addressed to the some of the plurality of telephone numbers to a third plurality of wireless communication devices, whereby a single telephone number is leveraged at different times by two different wireless communication devices located in the same region.

In another embodiment, the processing of block 208 and of block 212 is different. Instead of sending the eSIM provisioning data bundle in one or more SMS message or MMS message, an SMS message or MMS message is sent to the wireless communication devices addressed using the telephone number, the SMS message or MMS message comprises an address of a provisioning server, the subject wireless communication devices establish communication sessions with the provisioning server based on that address, and the eSIM provisioning data bundle is downloaded to the wireless communication devices via the communication session (e.g., via a BIP communication session, via a HTTP session, or via a different data communication protocol session).

Figure 4:
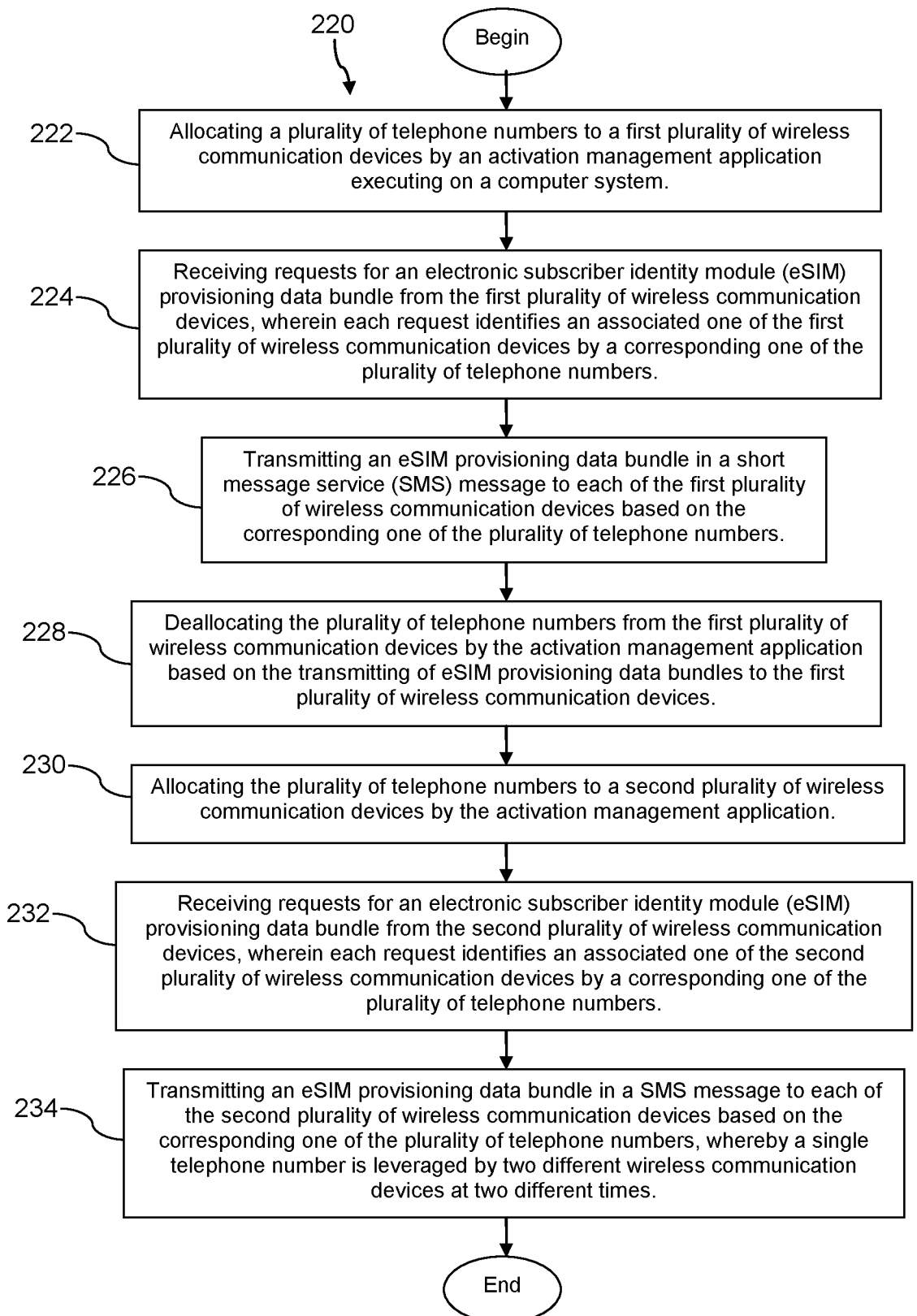
FIG. 4 is a flow chart of another method according to an embodiment of the disclosure.

Turning now to FIG. 4, a method 220 is described. In an embodiment, the method 220 is a method of provisioning wireless communication service to wireless communication devices. At block 222, the method 220 comprises allocating a plurality of telephone numbers to a first plurality of wireless communication devices by an activation management application executing on a computer system. In an embodiment, the allocation of telephone numbers of block 222 may comprise the activation management application 104 creating associations between each of the telephone numbers and an identity of an associated one of the first plurality of mobile communication devices and storing these associations in the data store 106.

At block 224, the method 220 comprises receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers. At block 226, the method 220 comprises transmitting an eSIM provisioning data bundle in a short message service (SMS) message or multimedia message service (MMS) message to each of the first plurality of wireless communication devices based on the corresponding one of the plurality of telephone numbers. In an embodiment, the first plurality of wireless communication devices may not be provisioned with an Internet address when the eSIM provision data bundles are transmitted in the SMS messages or MMS messages to the first plurality of wireless communication devices. The eSIM provisioning data bundles may then be used to configure the first plurality of wireless communication devices to receive wireless communication services, for example subscription wireless communication services. A bootstrap eSIM profile of the wireless communication devices may be erased and/or overwritten when the eSIM provisioning bundle is downloaded onto the wireless communication device. In an embodiment, the eSIM provisioning data bundle may be transmitted in a series of SMS messages or a series of MMS messages to each of the first plurality of wireless communication devices (e.g., the eSIM provisioning data bundle may be too large to be transmitted in a single SMS message or a single MMS message).

At block 228, the method 220 comprises deallocating the plurality of telephone numbers from the first plurality of wireless communication devices by the activation management application based on the transmitting of eSIM provisioning data bundles to the first plurality of wireless communication devices. In some embodiments, deallocating the plurality of telephone numbers from the first plurality of wireless communication devices may comprise deleting an association between each telephone number and an associated one of the first plurality of wireless communication devices in a data store and adding each deallocated telephone number to a free telephone number table in the data store.

It is understood that the deallocation of telephone numbers may proceed one at a time. For example, a first device of the first plurality of wireless communication devices may request an eSIM provisioning data bundle, an eSIM provisioning data bundle may be delivered to the first device, and the telephone number associated with that first device may be deallocated, while the telephone numbers associated with others of the first plurality of wireless communication devices may remain allocated to those other devices. Later, a second device of the first plurality of wireless communication devices may request an eSIM provisioning data bundle, an eSIM provisioning data bundle may be delivered to the second device, and the telephone number associated with that second device may be deallocated, while telephone numbers associated with the remainder of the first plurality of wireless communication devices (e.g., excepting the first device and the second device) remain allocated to those other devices.

At block 230, the method 220 comprises allocating the plurality of telephone numbers to a second plurality of wireless communication devices by the activation management application. In some embodiments, allocating the plurality of telephone numbers to the second plurality of wireless communication devices may comprise deleting each of the plurality of telephone numbers from the free telephone numbers table in the data store and adding an association between each telephone number and an associated one of the second plurality of wireless communication devices in the data store 106.

At block 232, the method 220 comprises receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers. At block 234, the method 300 comprises transmitting an eSIM provisioning data bundle in a SMS message or MMS message to each of the second plurality of wireless communication devices based on the corresponding one of the plurality of telephone numbers, whereby a single telephone number is leveraged by two different wireless communication devices at two different times. In an embodiment, the second plurality of wireless communication devices may not be provisioned with an Internet address when the eSIM provision data bundles are transmitted in the SMS messages or MMS messages to the second plurality of wireless communication devices. The eSIM provisioning data bundle may then be used to configure the first plurality of wireless communication devices to receive wireless communication services, for example subscription wireless communication services. A bootstrap eSIM profile of the wireless communication devices may be erased and/or overwritten when the eSIM provisioning bundle is downloaded onto the wireless communication device. In an embodiment, the eSIM provisioning data bundles may be transmitted in a series of SMS messages or a series of MMS messages to each of the second plurality of wireless communication devices (e.g., the eSIM provisioning data bundle may be too large to be transmitted in a single SMS message or a single MMS message).

In another embodiment, the processing of block 226 and of block 234 is different. Instead of sending the eSIM provisioning data bundle in one or more SMS message or MMS message, an SMS message or MMS message is sent to the wireless communication devices addressed using the telephone number, the SMS message or MMS message comprises an address of a provisioning server, the subject wireless communication devices establish communication sessions with the provisioning server based on that address, and the eSIM provisioning data bundle is downloaded to the wireless communication devices via the communication session (e.g., via a BIP communication session, via a HTTP session, or via a different data communication protocol session).

Figure 5A:
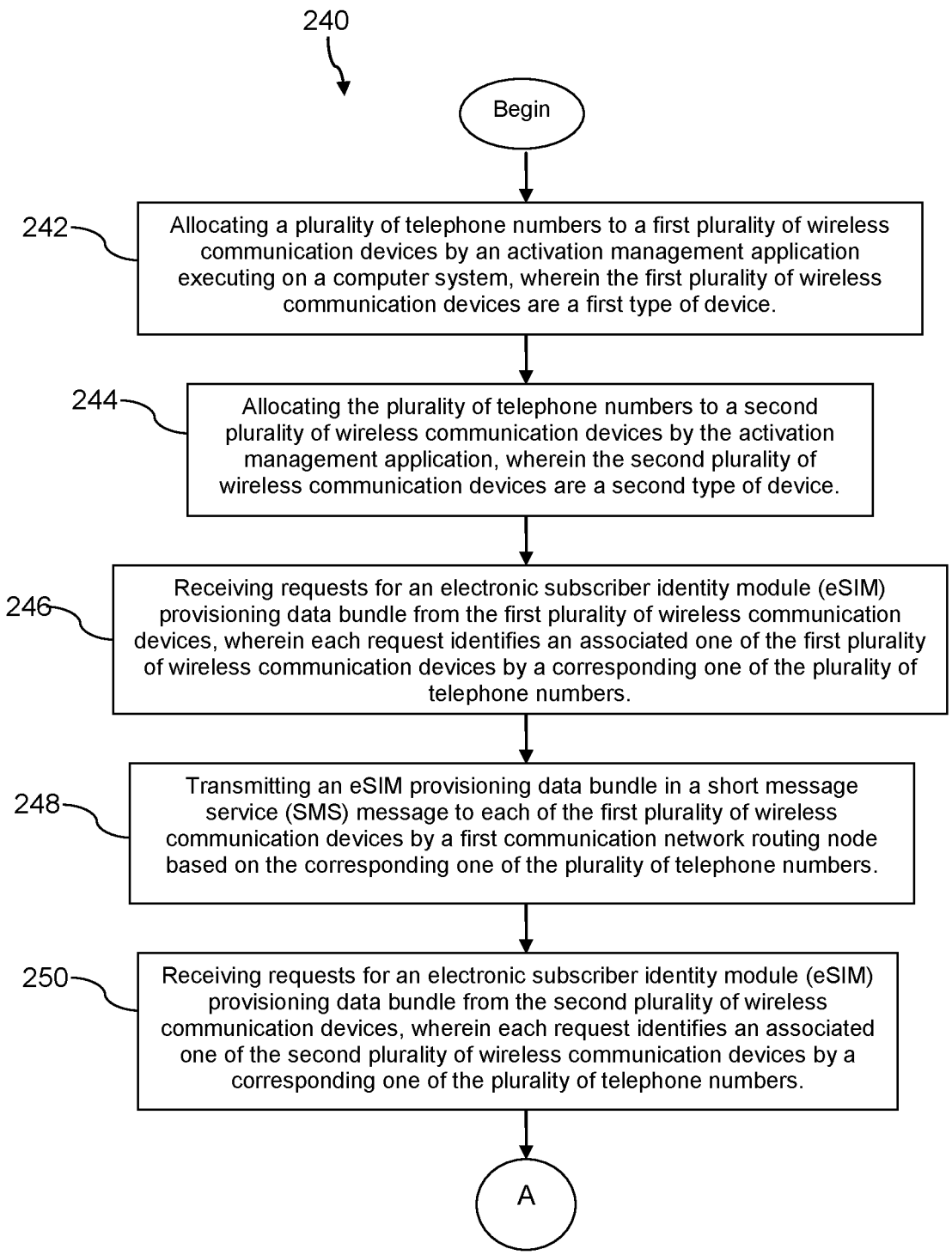
FIG. 5A and FIG. 5B are a flow chart of yet another method according to an embodiment of the disclosure.
Figure 5B:
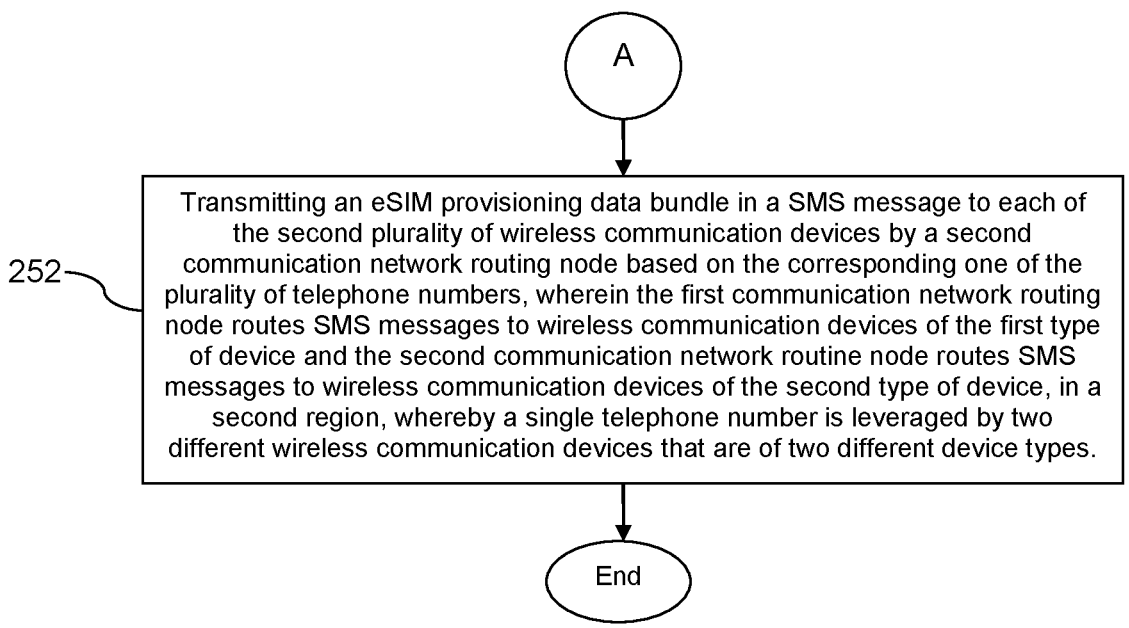

Turning now to FIG. 5A and FIG. 5B, a method 240 is described. In an embodiment, the method 240 is a method of provisioning wireless communication service to wireless communication devices. At block 242, the method 240 comprises allocating a plurality of telephone numbers to a first plurality of wireless communication devices by an activation management application executing on a computer system, where the first plurality of wireless communication devices are a first type of device. In an embodiment, the method 240 may further comprise provisioning the first communication network routing node to route SMS messages and/or MMS addressed to the plurality of telephone numbers to the first plurality of wireless communication devices.

At block 244, the method 240 comprises allocating the plurality of telephone numbers to a second plurality of wireless communication devices by the activation management application, wherein the second plurality of wireless communication devices is a second type of device. In an embodiment, the method 240 may further comprise provisioning the second communication network routing node to route SMS messages addressed to the plurality of telephone numbers to the second plurality of wireless communication devices. In an embodiment, the first type of devices comprise wireless communication devices having a first type of operating system installed and the second type of devices comprise wireless communication devices having a second type of operating system installed. In an embodiment, the first type of devices comprise laptop computers, notebook computers, and tablet computers, and the second type of devices comprise mobile phones, personal digital assistants (PDAs), and wearable computers. At block 246, the method 240 comprises receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers.

At block 248, the method 240 comprises transmitting an eSIM provisioning data bundle in a short message service (SMS) message or in a multimedia message service (MMS) message to each of the first plurality of wireless communication devices by a first communication network routing node based on the corresponding one of the plurality of telephone numbers. At block 250, the method 240 comprises receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers. At block 252, the method 240 comprises transmitting an eSIM provisioning data bundle in a SMS message or a MMS message to each of the second plurality of wireless communication devices by a second communication network routing node based on the corresponding one of the plurality of telephone numbers, wherein the first communication network routing node routes SMS messages and/or MMS messages to wireless communication devices of the first type of device and the second communication network routine node routes SMS messages and/or MMS messages to wireless communication devices of the second type of device, whereby a single telephone number is leveraged by two different wireless communication devices that are of two different device types.

In another embodiment, the processing of block 248 and of block 252 is different. Instead of sending the eSIM provisioning data bundle in one or more SMS message or MMS message, an SMS message or MMS message is sent to the wireless communication devices addressed using the telephone number, the SMS message or MMS message comprises an address of a provisioning server, and the subject wireless communication devices establish communication sessions with the provisioning server based on that address, and the eSIM provisioning data bundle is downloaded to the wireless communication devices via the communication session (e.g., via a BIP communication session, via a HTTP session, or via a different data communication protocol session).

Figure 6:
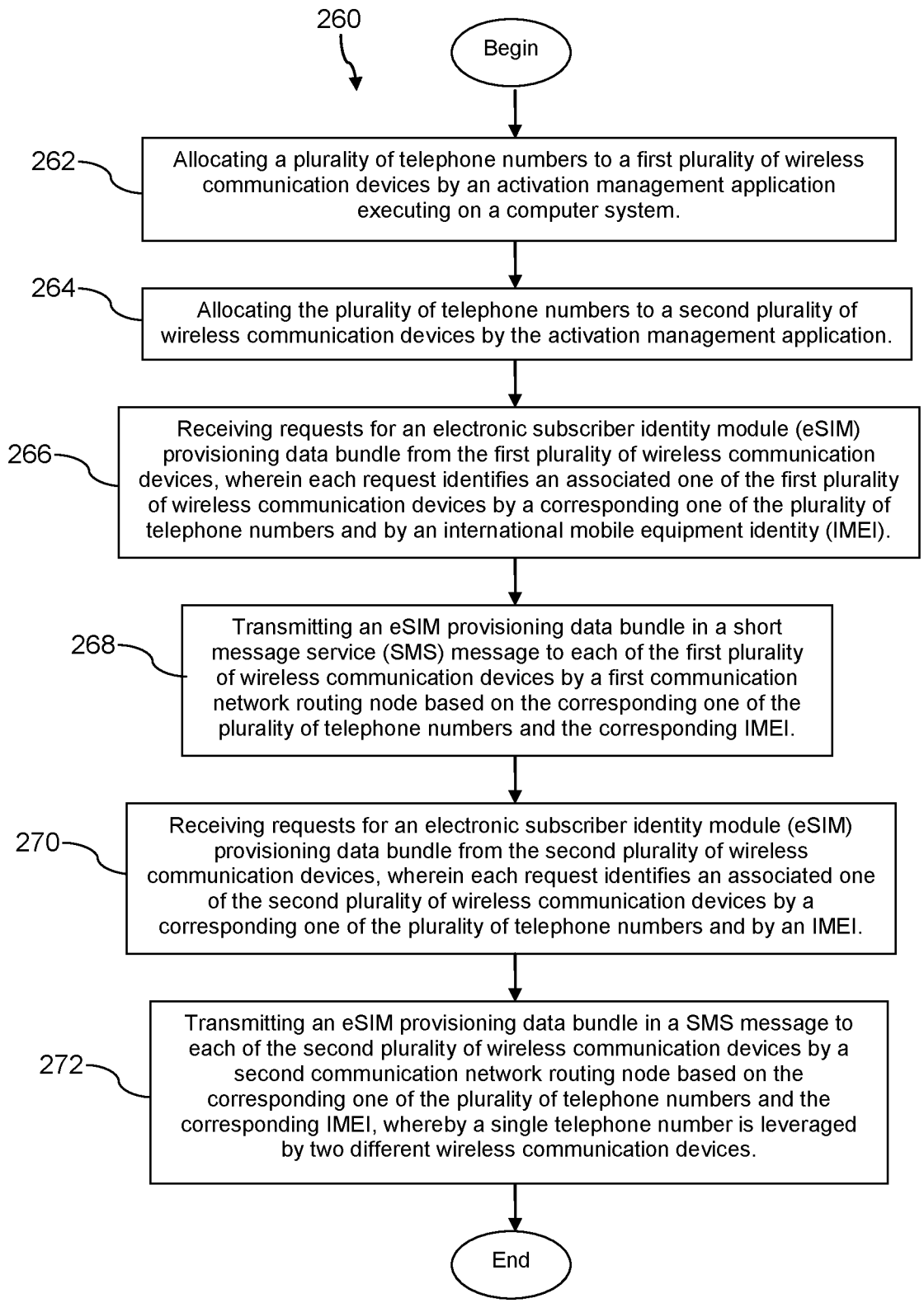
FIG. 6 is a flow chart of yet another method according to an embodiment of the disclosure.

Turning now to FIG. 6, a method 260 is described. In an embodiment, the method 260 is a method of provisioning wireless communication service to wireless communication devices. At block 262, the method 260 comprises allocating a plurality of telephone numbers to a first plurality of wireless communication devices by an activation management application executing on a computer system.

At block 264, the method 260 comprises allocating the plurality of telephone numbers to a second plurality of wireless communication devices by the activation management application. At block 266, the method 260 comprises receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers and by an international mobile equipment identity (IMEI).

At block 268, the method 260 comprises transmitting an eSIM provisioning data bundle in a short message service (SMS) message or multimedia message service (MMS) message to each of the first plurality of wireless communication devices by a first communication network routing node based on the corresponding one of the plurality of telephone numbers and the corresponding IMEI. At block 270, the method 260 comprises receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers and by an IMEI. At block 272, the method 260 comprises transmitting an eSIM provisioning data bundle in a SMS message or MMS message to each of the second plurality of wireless communication devices by a second communication network routing node based on the corresponding one of the plurality of telephone numbers and the corresponding IMEI, whereby a single telephone number is leveraged by two different wireless communication devices.

In another embodiment, the processing of block 268 and of block 272 is different. Instead of sending the eSIM provisioning data bundle in one or more SMS message or MMS message, an SMS message or MMS message is sent to the wireless communication devices addressed using the telephone number, the SMS message or MMS message comprises an address of a provisioning server, and the subject wireless communication devices establish communication sessions with the provisioning server based on that address, and the eSIM provisioning data bundle is downloaded to the wireless communication devices via the communication session (e.g., via a BIP communication session, via a HTTP session, or via a different data communication protocol session).

Figure 7:
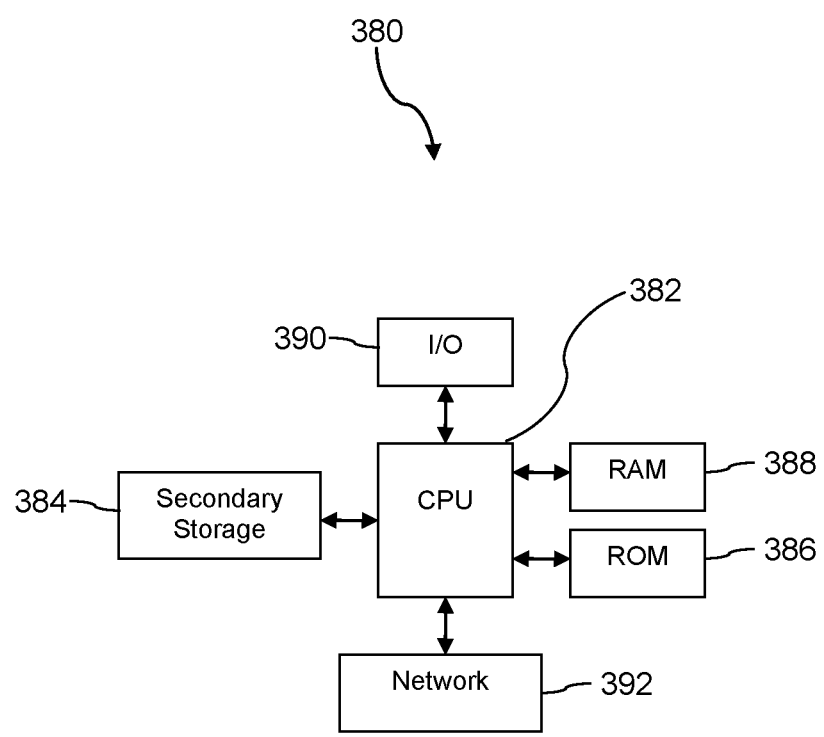
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning wireless communication service to wireless communication devices, comprising:
   allocating a plurality of telephone numbers to a first plurality of wireless communication devices by an activation management application executing on a computer system;
   allocating the plurality of telephone numbers to a second plurality of wireless communication devices by the activation management application;
   receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers;
   transmitting an eSIM provisioning data bundle in a short message service (SMS) message to each of the first plurality of wireless communication devices by a first communication network routing node based on the corresponding one of the plurality of telephone numbers;

receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers; and transmitting an eSIM provisioning data bundle in a SMS message to each of the second plurality of wireless communication devices by a second communication network routing node based on the corresponding one of the plurality of telephone numbers, wherein the first communication network routing node routes SMS messages in a first region and the second communication network routine node routes SMS messages in a second region, whereby a single telephone number is leveraged by two different wireless communication devices located in different regions.

2. The method of claim 1, wherein the telephone numbers are ten-digit telephone numbers.

3. The method of claim 1, wherein the telephone numbers are comprised of ten-digit telephone numbers padded with extra digits to extend the range of different values of a pool of ten-digit telephone numbers associated to a wireless communication service provider.

4. The method of claim 1, further comprising:
provisioning the first communication network routing node to route SMS messages addressed to the plurality of telephone numbers to the first plurality of wireless communication devices; and
provisioning the second communication network routing node to route SMS messages addressed to the plurality of telephone numbers to the second plurality of wireless communication devices.

5. The method of claim 1, wherein the eSIM provisioning data bundles comprise one or more of a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key.

6. The method of claim 1, wherein the first communication network routing node is a home location register (HLR).

7. The method of claim 1, wherein the wireless communication devices are Internet-of-things (IoT) devices.

8. A method of provisioning wireless communication service to wireless communication devices, comprising:
allocating a plurality of telephone numbers to a first plurality of wireless communication devices by an activation management application executing on a computer system;
receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers;
transmitting an eSIM provisioning data bundle in a short message service (SMS) message to each of the first plurality of wireless communication devices based on the corresponding one of the plurality of telephone numbers;
deallocating the plurality of telephone numbers from the first plurality of wireless communication devices by the activation management application based on the transmitting of eSIM provisioning data bundles to the first plurality of wireless communication devices;

allocating the plurality of telephone numbers to a second plurality of wireless communication devices by the activation management application;

receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers; and transmitting an eSIM provisioning data bundle in a SMS message to each of the second plurality of wireless communication devices based on the corresponding one of the plurality of telephone numbers, whereby a single telephone number is leveraged by two different wireless communication devices at two different times.

9. The method of claim 8, wherein the wireless communication devices are Internet-of-things devices.

10. The method of claim 9, wherein the wireless communication devices are not provisioned with an Internet address when the eSIM provisioning data bundles are transmitted in the SMS messages to the wireless communication devices.

11. The method of claim 8, wherein the eSIM provisioning data bundles comprise one or more of a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key.

12. The method of claim 11, wherein each of the eSIM provisioning data bundles comprise an Internet address of the associated wireless communication device.

13. The method of claim 8, wherein the telephone numbers are ten-digit telephone numbers.

14. The method of claim 8, wherein the telephone numbers are comprised of ten-digit telephone numbers padded with extra digits to extend the range of different values of a pool of ten-digit telephone numbers associated to a wireless communication service provider.

15. A method of provisioning wireless communication service to wireless communication devices, comprising:
allocating a plurality of telephone numbers to a first plurality of wireless communication devices by an activation management application executing on a computer system, where the first plurality of wireless communication devices are a first type of device;
allocating the plurality of telephone numbers to a second plurality of wireless communication devices by the activation management application, wherein the second plurality of wireless communication devices are a second type of device;
receiving requests for an electronic subscriber identity module (eSIM) provisioning data bundle from the first plurality of wireless communication devices, wherein each request identifies an associated one of the first plurality of wireless communication devices by a corresponding one of the plurality of telephone numbers;
transmitting an eSIM provisioning data bundle in a short message service (SMS) message to each of the first plurality of wireless communication devices by a first communication network routing node based on the corresponding one of the plurality of telephone numbers;
receiving requests for an electronic subscriber identity module (eSIM) provisioning data bundle from the second plurality of wireless communication devices, wherein each request identifies an associated one of the second plurality of wireless communication devices by a corresponding one of the plurality of telephone numbers; and transmitting an eSIM provisioning data bundle in a SMS message to each of the second plurality of wireless communication devices by a second communication network routing node based on the corresponding one of the plurality of telephone numbers, wherein the first communication network routing node routes SMS messages to wireless communication devices of the first type of device and the second communication network routine node routes SMS messages to wireless communication devices of the second type of device, whereby a single telephone number is leveraged by two different wireless communication devices that are of two different device types.

16. The method of claim 15, wherein the first type of devices comprise wireless communication devices having a first type of operating system and the second type of devices comprise wireless communication devices having a second type of operating system.

17. The method of claim 15, wherein the first type of devices comprise laptop computers, notebook computers, and tablet computers and wherein the second type of devices comprise mobile phones, personal digital assistants (PDAs), and wearable computers.

18. The method of claim 15, wherein the telephone numbers are ten-digit telephone numbers.

19. The method of claim 15, wherein the telephone numbers are comprised of ten-digit telephone numbers padded with extra digits to extend the range of different values of a pool of ten-digit telephone numbers associated to a wireless communication service provider.

20. The method of claim 15, wherein the wireless communication devices are Internet-of-things (IoT) devices.

* * * * *